(12) United States Patent
Stoddard et al.

(10) Patent No.: US 6,296,279 B1
(45) Date of Patent: Oct. 2, 2001

(54) VEHICLE FENDER PROTECTION DEVICE

(76) Inventors: Keith J. Stoddard; Christopher Chlebek, both of 836 Park St., Attleboro, MA (US) 02703

( * ) Notice: Subject to any disclaimer, the term of this patent is extended or adjusted under 35 U.S.C. 154(b) by 0 days.

(21) Appl. No.: 09/428,855

(22) Filed: Oct. 28, 1999

(51) Int. Cl.[7] ............................................ B60R 9/02
(52) U.S. Cl. ....................................................... 280/770
(58) Field of Search ................... 280/770; 296/98, 296/43; 160/23.1, 24, 314

(56) References Cited

U.S. PATENT DOCUMENTS

| | | | |
|---|---|---|---|
| D. 354,039 | 1/1995 | Kuoppala . | |
| 1,569,118 | * 1/1926 | Curtis | 160/27 |
| 4,273,377 | 6/1981 | Alexander . | |
| 4,518,194 | 5/1985 | Kirkham et al. . | |
| 4,530,519 | * 7/1985 | Marshall | 280/770 |
| 4,583,777 | 4/1986 | Myburgh . | |
| 4,706,991 | * 11/1987 | Miller | 280/770 |
| 4,884,824 | * 12/1989 | Radke | 280/770 |
| 4,987,942 | 1/1991 | Eriksson . | |
| 5,360,250 | * 11/1994 | Wood et al. | 296/43 |
| 5,658,037 | 8/1997 | Evans et al. . | |
| 5,788,307 | * 8/1998 | Gilbert | 280/770 |
| 6,073,964 | * 6/2000 | Smith | 280/770 |
| 6,155,328 | * 12/2000 | Welfonder | 160/313 |

* cited by examiner

*Primary Examiner*—Douglas Hess
*Assistant Examiner*—Elaine Gort

(57) ABSTRACT

A vehicle fender protection device for preventing a fender of a vehicle from being scratched or dented. The vehicle fender protection device includes a housing assembly adapted for removably coupling to the rear fender of the truck. A fender cover adapted for selectively hanging over the rear fender of the truck to absorb dent and scratch causing impacts. The fender cover is extendable from and retractable into said housing assembly.

8 Claims, 3 Drawing Sheets

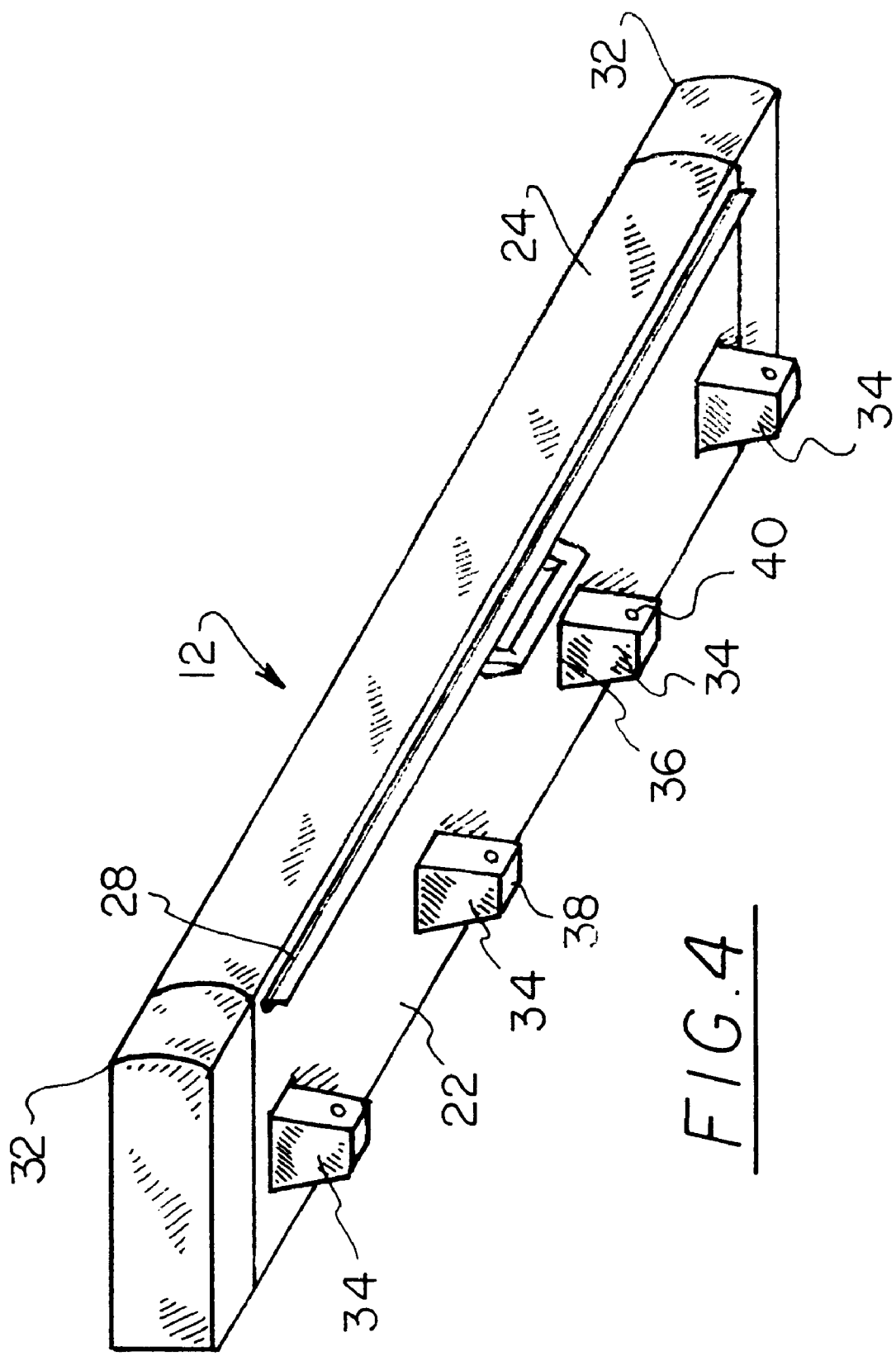

VEHICLE FENDER PROTECTION DEVICE

BACKGROUND OF THE INVENTION

1. Field of the Invention

The present invention relates to retractable closure systems and more particularly pertains to a new vehicle fender protection device for preventing a fender of a vehicle from being scratched or dented.

2. Description of the Prior Art

The use of retractable closure systems is known in the prior art. More specifically, retractable closure systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,987,942; and 4,273,377; U.S. Pat. No. Des. 354,039; U.S. Pat. Nos. 6,568,037; 4,518,194; and 4,583,777.

While these devices fulfill their respective, particular objectives and requirements, the aforementioned patents do not disclose a new vehicle fender protection device. The inventive device includes a housing assembly adapted for removably coupling to the rear fender of the truck. A fender cover adapted for selectively hanging over the rear fender of the truck to absorb dent and scratch causing impacts. The fender cover is extendable from and retractable into said housing assembly.

In these respects, the vehicle fender protection device according to the present invention substantially departs from the conventional concepts and designs of the prior art, and in so doing provides an apparatus primarily developed for the purpose of preventing a fender of a vehicle from being scratched or dented.

SUMMARY OF THE INVENTION

In view of the foregoing disadvantages inherent in the known types of retractable closure systems now present in the prior art, the present invention provides a new vehicle fender protection device construction wherein the same can be utilized for preventing a fender of a vehicle from being scratched or dented.

The general purpose of the present invention, which will be described subsequently in greater detail, is to provide a new vehicle fender protection device apparatus and method which has many of the advantages of the retractable closure systems mentioned heretofore and many novel features that result in a new vehicle fender protection device which is not anticipated, rendered obvious, suggested, or even implied by any of the prior art retractable closure systems, either alone or in any combination thereof.

To attain this, the present invention generally comprises a housing assembly adapted for removably coupling to the rear fender of the truck. A fender cover adapted for selectively hanging over the rear fender of the truck to absorb dent and scratch causing impacts. The fender cover is extendable from and retractable into said housing assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle fender protection device apparatus and method which has many of the advantages of the retractable closure systems mentioned heretofore and many novel features that result in a new vehicle fender protection device which is not anticipated, rendered obvious, suggested, or even implied by any of the prior art retractable closure systems, either alone or in any combination thereof.

It is another object of the present invention to provide a new vehicle fender protection device which may be easily and efficiently manufactured and marketed.

It is a further object of the present invention to provide a new vehicle fender protection device which is of a durable and reliable construction.

An even further object of the present invention is to provide a new vehicle fender protection device which is susceptible of a low cost of manufacture with regard to both materials and labor, and which accordingly is then susceptible of low prices of sale to the consuming public, thereby making such vehicle fender protection device economically available to the buying public.

Still yet another object of the present invention is to provide a new vehicle fender protection device which provides in the apparatuses and methods of the prior art some of the advantages thereof, while simultaneously overcoming some of the disadvantages normally associated therewith.

Still another object of the present invention is to provide a new vehicle fender protection device for preventing a fender of a vehicle from being scratched or dented.

Yet another object of the present invention is to provide a new vehicle fender protection device which includes a housing assembly adapted for removably coupling to the rear fender of the truck. A fender cover adapted for selectively hanging over the rear fender of the truck to absorb dent and scratch causing impacts. The fender cover is extendable from and retractable into said housing assembly.

Still yet another object of the present invention is to provide a new vehicle fender protection device that allows a user to work close the vehicle without concern for scratching or denting the fender.

Even still another object of the present invention is to provide a new vehicle fender protection device that will not hinder other vehicle accessories such as toolboxes to be mounted to the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a bottom perspective view of the present invention.

DESCRIPTION OF THE PREFERRED EMBODIMENT

Figure 1:
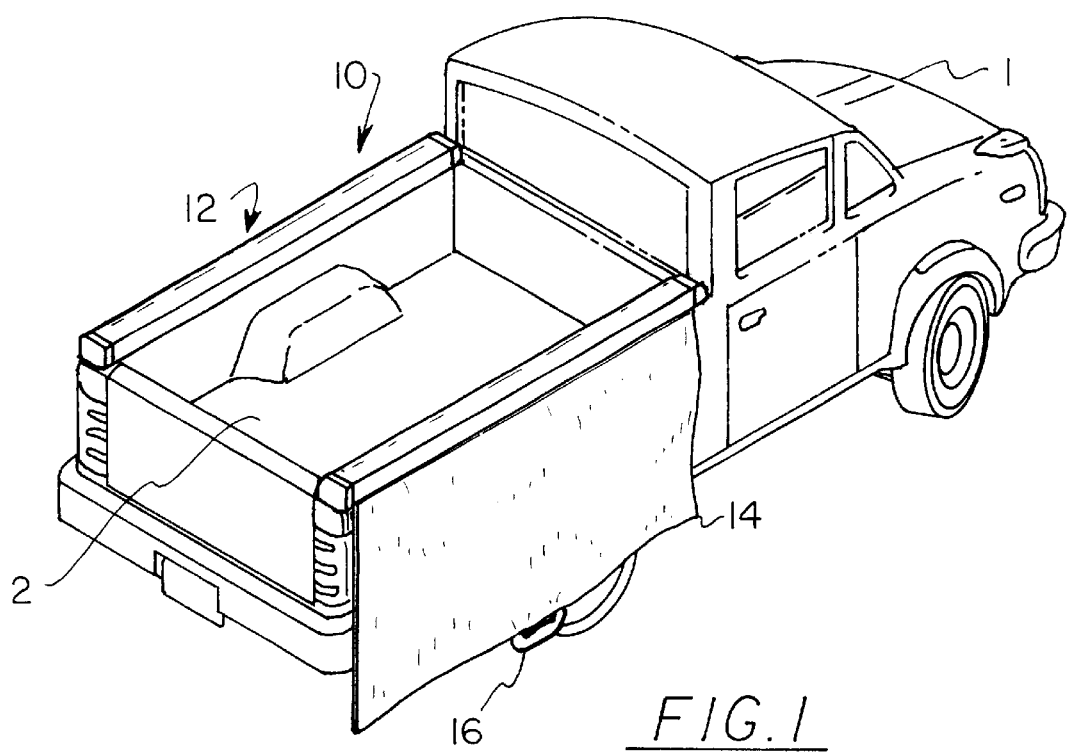
FIG. 1 is a top perspective view of a new vehicle fender protection device according to the present invention.

With reference now to the drawings, and in particular to FIGS. 1 through 4 thereof, a new vehicle fender protection device embodying the principles and concepts of the present invention and generally designated by the reference numeral 10 will be described.

As best illustrated in FIGS. 1 through 4, the vehicle fender protection device 10 generally comprises a truck 1 having a bed 2 and a pair of rear fenders 3. The fenders are located on opposing sides of the bed.

A fender protection apparatus. The fender protection apparatus comprises a housing assembly 12 adapted for removably coupling to one of the rear fenders of the truck, and a fender cover 14 adapted for selectively hanging over one of the rear fenders of the truck to absorb dent and scratch causing impacts.

As shown in FIG. 1, the fender cover is extendable from and retractable into the housing assembly The fender cover comprises a flexible substantially inelastic material. The fender cover has a handle 16 extending from a first end of the fender cover. The material of the fender cover is comprised of vinyl. Preferably the fender cover should extend to a length of approximately thirty inches from the housing assembly and be approximately one-eighth of an inch thick.

Figure 2:
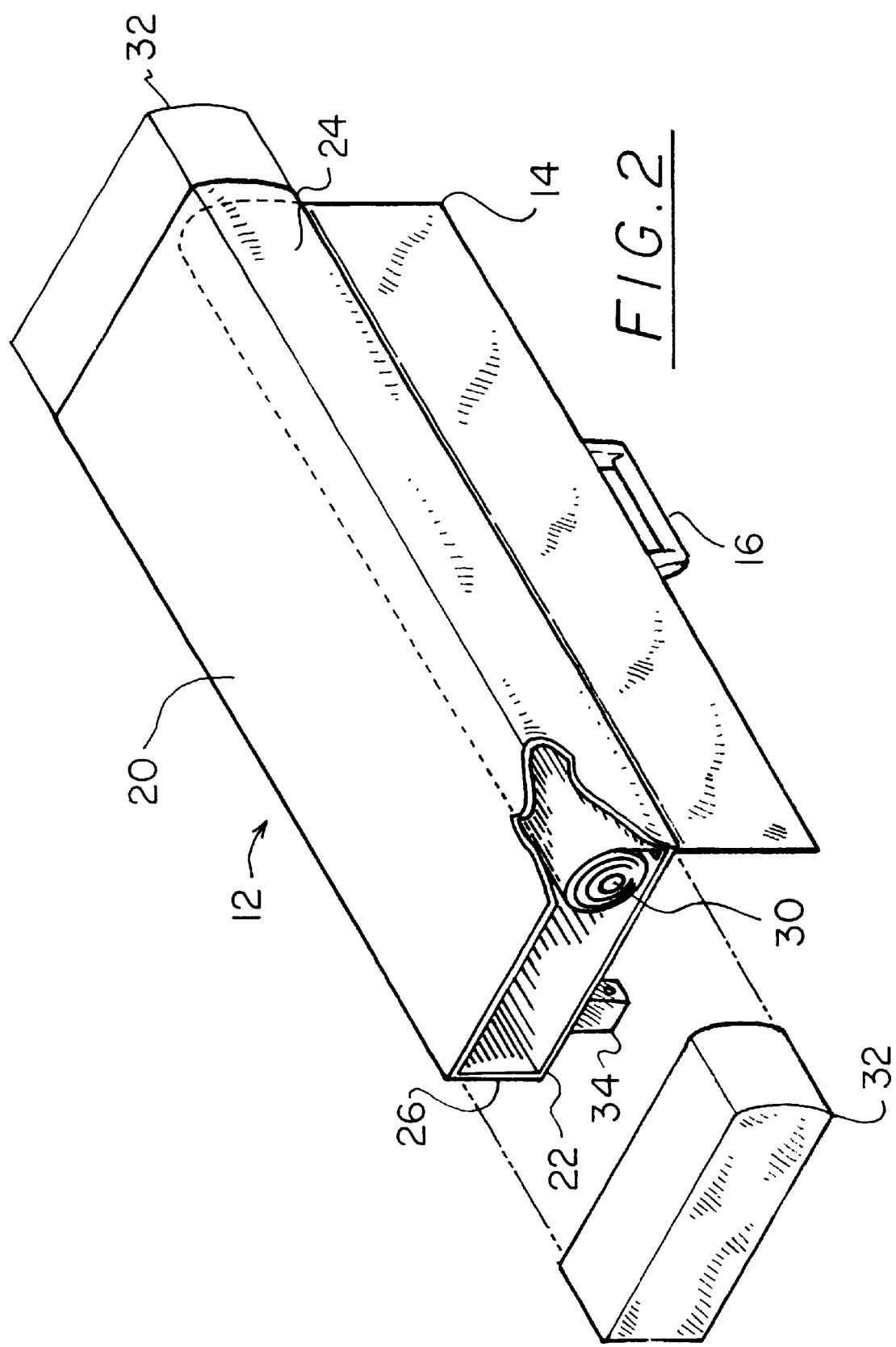
FIG. 2 is an enlarged top perspective view of the present invention with a portion of the frame shown broken away.

As shown in FIG. 2, the housing assembly has a frame 18. The frame has an upper wall 20, a lower wall 22, a front wall 24 and a rear wall 26. A portion of an interior space is formed between the walls. The bottom wall has a slot 28 therethrough positioned proximate the front wall. The slot is aligned with the front wall such that the fender cover extends from the interior space through the slot. A rod 30 is coupled to a second end of the fender cover. Preferably the housing assembly has a length of approximately four to eight feet with a width of approximately four inches and a height of approximately one and one-half inches. The upper wall of the frame preferably should be flat so that other truck equipment options such as toolboxes and racks can be secured to the upper wall of the frame.

Figure 3:
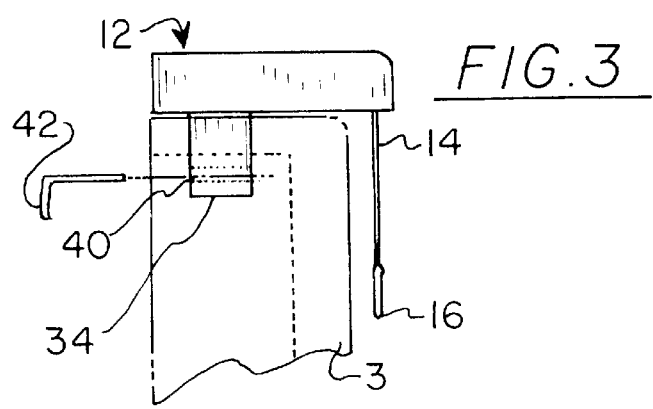
FIG. 3 is a side elevational view of the present invention.

As shown in FIGS. 3 and 4, a pair of winding assemblies 32 are operationally coupled to the rod for selectively retracting the fender cover around the rod in the housing assembly and holding the fender cover in a tension condition from the rod when the fender cover is extended from the housing assembly. Each of the winding assemblies is coupled to opposing ends of the frame of the housing assembly.

A plurality of mounting members 34 for mounting the housing to the fender of the truck. The mounting members are for extending through an upper portion of one of the rear fenders of the truck such that the fender cover is suspended a distance away from the rear fender of the truck is coupled to the bottom wall of the frame of the housing assembly. The mounting members are coupled proximate the rear wall of the frame of the housing assembly. Each of the mounting member has frusto-pyramidal configuration such that a first end 36 of each of the mounting members is wider than a second end 38 of each of the mounting members. The first end of each of the mounting members is mounted to the bottom wall of the frame of the housing.

Each of the mounting members has an aperture 40 therethrough. The aperture is proximate the second end of the mounting member. A retaining pin 42 is passed through the aperture of the mounting means such that the upper portion of the rear fender of the truck is secured between the frame of the housing assembly and the retaining pin.

In use, the user would secure the housing assembly to the fender of the truck with the retaining pins to prevent the housing assembly from coming away from the fender. The user would then extend the fender cover downward so that the fender is covered. With the fender cover extended the fender cover would protect the fender from being dented or scratched by light impacts from such items such as tools. When the user is ready to depart the winding assemblies would then draw the fender cover back into the housing assembly for storage during transport.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

We claim:

1. A fender protection device for protecting a rear fender of a truck from dents and scratches while working in a bed of the truck, the fender protection device comprising:

an elongate housing assembly adapted for removably coupling to the rear fender of the truck, said housing assembly having a frame, said frame having an upper wall, a lower wall, a front wall and a rear wall, an interior space of said housing assembly being defined between said walls;

a fender cover located in said interior space of said housing assembly and being extendable from and retractable into said housing assembly for selectively hanging over the rear fender of the truck to absorb dent and scratch causing impacts;

at least two mounting members for mounting said housing to the fender of the truck, said mounting members being mounted on said lower wall of said housing and extending in a substantially perpendicular relationship to said lower wall for protruding through an upper portion of the rear fender of the truck, said mounting members being located proximate to said rear wall; and a slot formed through said lower wall at a location proximate to said front wall, said fender cover extending from said interior space and through said slot for permitting extension and retraction movement of said fender cover through said slot;

wherein said mounting members are located along a longitudinally-extending axis that is transversely spaced on said lower wall from said slot such that said fender cover is suspendable a distance away from the rear fender of the truck when said mounting members are positioned through the upper portion of the rear fender for minimizing any contact between said fender cover and a front face of said rear fender and thereby minimizing marring of the front face of the fender by said fender cover.

2. The fender protection device as set forth in claim 1 wherein said fender cover is comprised of a flexible inelastic material.

3. The fender protection device as set forth in claim 2 wherein said fender cover is comprised of vinyl.

4. The fender protection device as set forth in claim 1 wherein said fender cover has a handle extending from a first end of said fender cover.

5. The fender protection device as set forth in claim 1 wherein said housing assembly has a rod coupled to a second end of said fender cover, a pair of winding assemblies being operationally coupled to said rod for selectively retracting said fender cover around said rod in said housing assembly and holding said fender cover in a tension condition from said rod when said fender cover is extended from said housing assembly, each of said winding assemblies being coupled to opposing ends of said frame of said housing assembly.

6. The fender protection device as set forth in claim 1 wherein each of said mounting members has an aperture therethrough, a retaining pin being for passing through said aperture of one of said mounting members such that the upper portion of the fender is secured between said frame of said housing assembly and said retaining pin.

7. The fender protection device as set forth in claim 1 wherein said lower wall has a central longitudinal axis extending substantially parallel to said front and rear walls and substantially equidistant between said front and rear walls, said mounting members being mounted on said lower wall on a first side of said central longitudinal axis and said slot being located on a second side of said central longitudinal axis so that said mounting members and said slot are located on opposite side of said central longitudinal axis for minimizing any contact between said fender cover and the front face of said rear fender.

8. A fender protection system comprising:

a truck having a bed and a pair of rear fenders, said fenders being located on opposing sides of said bed;

a fender protection apparatus mounted on one of said rear fenders of said truck, said fender protection apparatus comprising:

a housing assembly removably coupled to one of said rear fenders of said truck, said housing assembly having a frame, said frame having an upper wall, a lower wall, a front wall and a rear wall, an interior space being formed between said walls;

a fender cover located in said interior space of said housing assembly and being extendable from and retractable into said housing assembly for selectively hanging over the rear fender of the truck to absorb dent and scratch causing impacts;

said fender cover comprising a flexible substantially inelastic material, said fender cover having a handle extending from a first end of said fender cover, said material of said fender cover being comprised of vinyl;

at least two mounting members mounting said housing to the fender of the truck, said mounting members being mounted on said lower wall of said housing and extending in a substantially perpendicular relationship to said lower wall and protruding through an upper portion of the rear fender of the truck, said mounting members being located proximate to said rear wall; and a slot formed through said lower wall at a location proximate to said front wall, said fender cover extending from said interior space and through said slot for permitting extension and retraction movement of said fender cover through said slot;

wherein said mounting members are located along a longitudinally-extending axis that is transversely spaced on said lower wall from said slot such that said fender cover is suspendable a distance away from the rear fender of the truck for minimizing any contact between said fender cover and a front face of said rear fender and thereby minimizing marring of the front face of the fender by said fender cover;

each of said mounting members having frusto-pyramidal configuration such that a first end of each of said mounting members is wider than a second end of each of said mounting members, said first end of each of said mounting members being mounted to said bottom wall of said frame of said housing; and each of said mounting members having an aperture therethrough, said aperture being proximate said second end of said mounting member, a retaining pin being for passing through said aperture of said mounting means such that said upper portion of said rear fender of said truck is secured between said frame of said housing assembly and said retaining pin.

* * * * *